United States Patent [19]

Ogihara et al.

[11] Patent Number: 4,978,061
[45] Date of Patent: Dec. 18, 1990

[54] AIR CONDITIONER SYSTEM FOR AUTOMOTIVE VEHICLE

[75] Inventors: Yoshiyuki Ogihara; Junichiro Hara; Hideo Takahashi, all of Kanagawa, Japan

[73] Assignee: Nissan Motor Company, Ltd., Yokohama, Japan

[21] Appl. No.: 286,826

[22] Filed: Dec. 20, 1988

[30] Foreign Application Priority Data

Dec. 21, 1987 [JP] Japan .................................. 62-323372

[51] Int. Cl.$^5$ ................................................. F24F 7/00
[52] U.S. Cl. ..................................... 236/49.3; 62/186; 98/2.01; 236/91 C
[58] Field of Search ................. 62/179, 186; 236/49.3, 236/91 C, 91 R; 98/40.26, 2.01; 165/43

[56] References Cited

U.S. PATENT DOCUMENTS 4,426,852  1/1984  Nishimura et al. .................... 62/179

FOREIGN PATENT DOCUMENTS 0082623   7/1981  Japan .................................. 236/91 C
57-140216 8/1982  Japan .

Primary Examiner—William E. Wayner
Attorney, Agent, or Firm—Pennie & Edmonds

[57] ABSTRACT

An air conditioner system for automotive vehicles includes a blower control unit for adjusting discharge amount of conditioning air into the vehicular cabin depending upon the difference between the set cabin temperature and the cabin temperature, and for causing the discharge amount of fluctuate so as to increase and decrease when the difference between the temperatures is less than a predetermined value. The periods through which the discharge amount is greater than and less than predetermined values, respectively, are controlled depending upon the monitored insolation. The air conditioner system also includes an air flow direction setting unit for adjusting direction of the conditioning air discharge from a vent nozzle. The air flow direction setting unit is operable between a concentrated discharge air mode in which the air flow discharged from the vent nozzle is concentrated on the vehicular occupants, and a diffused discharge air mode in which it is diffused so as not to be concentrated on the occupants. The air flow direction setting unit is operated in accordance with the discharge amount.

6 Claims, 4 Drawing Sheets

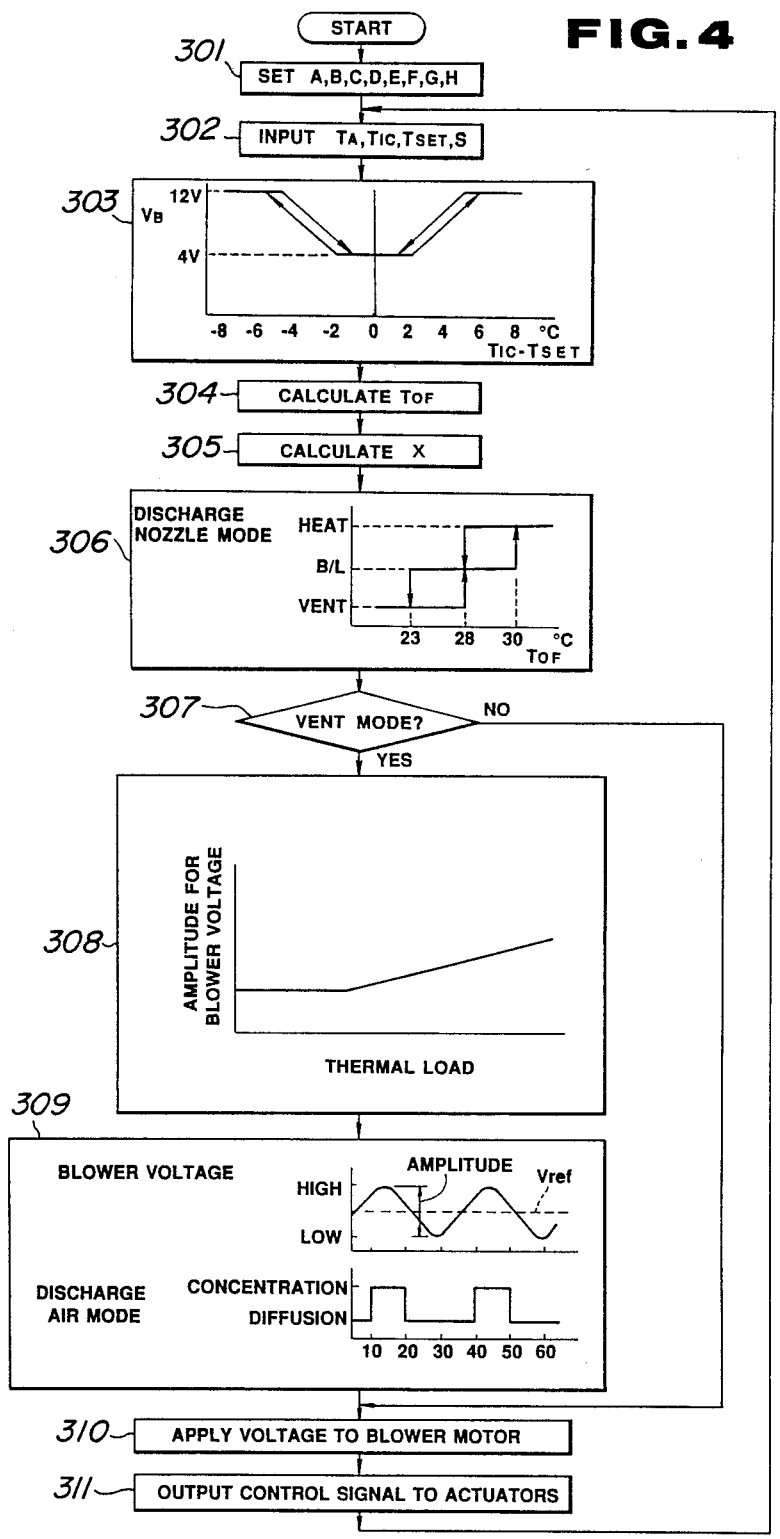

AIR CONDITIONER SYSTEM FOR AUTOMOTIVE VEHICLE

BACKGROUND OF THE INVENTION

1. Field of the Invention

The present invention relates generally to an air conditioner system for an automotive vehicle. More specifically, the invention relates to an air conditioner system which can automatically adjust blower speed to control air flow rate. More particularly, the invention relates to an air conditioner system which can automatically change the direction of discharge air.

2. Description of the prior Art

Various automotive air conditioner systems, which automatically adjust discharge air temperature and air flow rate to achieve comfortable conditions in a vehicular cabin, have been proposed. The Japanese Patent First (unexamined) Publication (Tokkai Sho.) No. 57-140216 discloses such an automatic air conditioner system. In the disclosed system, the voltage applied to a blower motor is controlled on the basis of temperature in the vehicular cabin. The voltage is decreased gradually as the cabin temperature approaches the set cabin temperature. Thereafter, when the difference between the cabin temperature and the set cabin temperature is less than 2° C., the voltage applied to the blower motor fluctuates periodically so that the rate of the conditioning air supplied to the vehicular cabin increases and decreases periodically. By this operation, the occupants of the vehicle feel a comfortably fluctuating breeze.

However, in such a conventional system, the voltage applied to the blower motor fluctuates in a similar pattern as long as the cabin temperature is constant. Therefore, when the thermal condition in the vehicular cabin other than the cabin temperature varies, i.e. when the thermal load applied to the occupants of the vehicular cabin due to insolation or solar radiation varies, the ventilation is not suitably altered. That is, when the thermal load is relatively high, for example, in fine weather in the daytime in summer, air flow to the occupants is insufficient to compensate for the high thermal load. On the other hand, when the insolation or thermal load is relatively low, the same air flow is perceived as excessive.

SUMMARY OF THE INVENTION

It is therefore a principal object of the present invention to eliminate the aforementioned disadvantage and to provide an air conditioner system which can suitably alter ventilation on the basis of thermal condition within the vehicular cabin, even if temperature in the vehicular cabin is essentially constant.

In order to accomplish the aforementioned and other specific objects, an air conditioner system, according to the present invention, includes means for adjusting discharge amount of conditioning air into the vehicular cabin on the basis of thermal condition within the vehicular cabin.

According to one aspect of the present invention, an air conditioner system for an automotive vehicle comprises:

conditioning air passage means defining a conditioning air path and including an air outlet which opens into a vehicular cabin for discharging conditioning air into the vehicular cabin;

conditioning air generating means for adjusting temperature of the conditioning air to be discharged into the vehicular cabin;

first control means, associated with the conditioning air generating means, for adjusting discharge amount of the conditioning air into the vehicular cabin on the basis of thermal condition within the vehicular cabin; and second control means for adjusting direction of the conditioning air discharged from the air outlet between a first direction in which the conditioning air discharged from the air outlet is concentrated on a region within the vehicular cabin, and a second direction in which the conditioning air is diffused over a wide area within the vehicular cabin, the second control means causing the conditioning air to be directed in the first direction when the discharge amount is greater than a predetermined value.

The first control means may include a blower driven by means of a blower motor, and may adjust voltage applied to the blower motor on the basis of thermal condition within the vehicular cabin. The voltage applied to the blower motor may fluctuate between a predetermined high voltage and a predetermined low voltage. In this case, the period of the high voltage may be set to increase as the thermal load within the vehicular cabin increases, and the period of the low voltage may be set to decrease as the thermal load increases. Alternatively, the voltage applied to the blower motor may fluctuate periodically, and the difference between the maximum and minimum values of the voltage may vary depending upon the thermal load within the vehicular cabin.

According to another aspect of the invention, an air conditioner system for an automotive vehicle comprises:

conditioning air passage means defining a conditioning air path and including an air outlet which opens into a vehicular cabin for discharging conditioning air into the vehicular cabin;

conditioning air generating means for adjusting temperature of the conditioning air to be discharged into the vehicular cabin;

temperature setting means for allowing manual setting of a desired temperature of the conditioning air in the vehicular cabin to produce a first signal indicative of the set temperature;

first sensor means for monitoring temperature in the vehicular cabin to produce a second signal indicative of the vehicular cabin temperature;

second sensor means for monitoring insolation in the vehicular cabin to produce a third signal indicative of the insolation;

first control means, associated with the conditioning air generating means, for adjusting discharge amount of the conditioning air into the vehicular cabin depending upon the relationship between the first, second and third signal values; and second control means for adjusting direction of the conditioning air discharged from the air outlet between a first direction in which the conditioning air discharged from the air outlet is concentrated on a region within the vehicular cabin, and a second direction in which the conditioning air is diffused over a wide area within the vehicular cabin, the second control means causing the conditioning air to be directed in the first direction when the discharge amount is greater than a predetermined value.

The first control means may adjust discharge amount of the conditioning air depending upon the difference between the first and second signal values, and causes the discharge amount to fluctuate so as to increase and decrease when the difference bewteen the first and second signal values is less than a predetermined value. The first means may include a blower driven by means of a blower motor, adjust voltage applied to the blower motor depending upon the first and second signal values, and cause the voltage to fluctuate so as to increase and decrease when the difference between the first and second signal values is less than the predetermined value. The voltage applied to the blower motor may fluctuate between a predetermined high voltage and a predetermined low voltage when the difference between the first and second signal values is less than the predetermined value. In this case, the period of the high voltage may be set to increase as the third signal value increases, and the period of the low voltage may be set to decrease as the third signal value increases. Alternatively, the voltage applied to the blower motor may fluctuate periodically when the difference between the first and second signal values is less than the predetermined value, and the difference between the maximum and minimum values of the voltage may vary depending upon the third signal value. The air outlet is preferably a vent nozzle. The difference between the first and second signal values is preferably 2° C.

According to another aspect of the invention, an air conditioner system for an automotive vehicle comprises:
conditioning air passage means defining a conditioning air path and including an air outlet which opens into a vehicular cabin for discharging conditioning air into the vehicular cabin;
conditioning air generating means for adjusting temperature of the conditioning air to be discharged into the vehicular cabin;
temperature setting means for allowing manual setting of a desired temperature of the conditioning air in the vehicular cabin to produce a first signal indicative of the set temperature;
first sensor means for monitoring temperature in the vehicular cabin to produce a second signal indicative of the vehicular cabin temperature;
second sensor means for monitoring insolation in the vehicular cabin to produce a third signal indicative of the insolation;
first control means, associated with the conditioning air generating means, for adjusting discharge amount of the conditioning air into the vehicular cabin depending upon the difference between the first and second signal values, and causing the discharge amount to fluctuate between predetermined low and high values when the difference between the first and second signal values is less than a predetermined value;
second control means for adjusting periods of low and high values depending upon the third signal value; and
third control means for adjusting direction of the conditioning air discharged from the air outlet between a first direction in which the conditioning air discharged from the air outlet is concentrated on a region within the vehicular cabin, and a second direction in which the conditioning air is diffused over a wide area within the vehicular cabin, the third control means causing the conditioning air to be directed in the first direction when the discharge amount is greater than a predetermined value.

BRIEF DESCRIPTION OF THE DRAWINGS

FIG. 4 is a flow chart illustrating a third preferred embodiment of control process in the air conditioner system of FIG. 1.

DESCRIPTION OF THE PREFERRED EMBODIMENT

Figure 1:
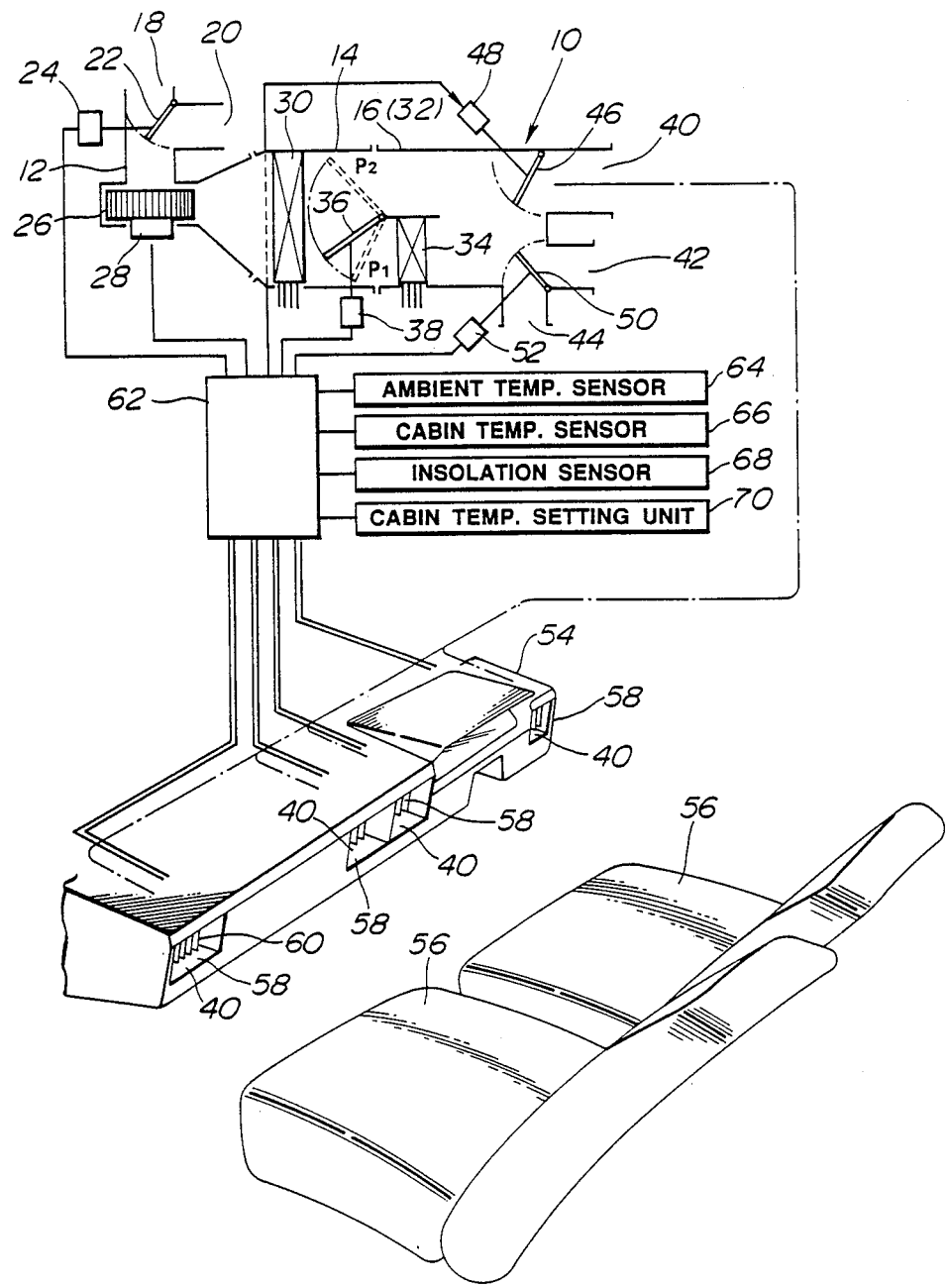
FIG. 1 is a schematic diagram of an air conditioner system according to the present invention.

Referring now to the drawings, particularly to FIG. 1, the preferred embodiment of an air conditioner system for an automotive vehicle, according to the present invention, includes a conditioning air duct assembly 10 which comprises a blower housing 12, a cooler unit housing 14 and an air mixing unit housing 16.

The blower housing 12 defines air inlets 18 and 20. The air inlet 18 draws air from the outside of the vehicle body, and thus will be referred to as "fresh air inlet". On the other hand, the air inlet 20 draws air from the vehicular cabin, and thus will be referred to as "recirculation air inlet". The fresh air inlet 18 and the recirculation air inlet 20 are selectively opened and closed by means of an air intake door 22. The air intake door 22 is hinged on the wall of the blower housing 12 to be operated between a recirculation air mode position, in which the fresh air inlet 18 is closed and the recirculation air inlet 20 is fully opened, and a fresh air mode position, in which the recirculation air inlet 20 is closed and the fresh air inlet 18 is fully opened. Therefore, when the air intake door 22 is disposed at the fresh air mode position, only the fresh air is introduced into the blower housing 12, and when it is disposed at the recirculation air mode position, only the air from the vehicular cabin is introduced thereto. Moreover, when the air intake door 22 is disposed at an intermediate position between the fresh and recirculation air mode positions, both the fresh air and the air from the vehicular cabin are introduced into the blower housing 12. The air intake door 22 is driven by an intake door actuator motor 24.

The blower housing 12 also defines a space for receiving a blower 26. The blower 26 is disposed at a location beneath the fresh air inlet 18, and is driven by means of a blower motor 28. The air introduced through the fresh air inlet 18 or the recirculation air inlet 20, is blown against an evaporator 30, which is housed within the cooler unit housing 14, by means of the blower 26. The air flow is cooled by the evaporator 30 in a well known manner, and is thereafter introduced into a conditioning air passage defined in the air mixing unit housing 16. The air introduced into the conditioning air passage 32 is blown against a heater core 32 housed in the air mixing unit housing 16. The proportion of air flow passing through the heater core 34 to that bypassing the latter is determined by an air-mix door 36 which is provided within the conditioning air passage 32. The air-mix door 36 is hinged on the wall of the heater core 34 to be operated between positions P1 and P2. When the air-mix door is disposed at the position P1, the air cooled by the evaporator 30 does not pass through the heater core 34, so that the temperature of the air passing through the conditioning air passage 32 is not increased. On the other hand, when the air-mix door 36 is disposed at the position P2, the air cooled by the evaporator 30 passes through the heater core 34, so that the temperature thereof is increased. Therefore, in accordance with opening angle of the air-mix door 36, the amount of the air passing through the heater core 34 can be changed for adjusting the temperature of the air passing through the conditioning air passage 32. The air-mix door 36 is driven by means of an air-mix door actuator motor 38.

The conditioning air passage 32 defines a vent nozzle 40, a defroster nozzle 42 and a foot nozzle 44. The vent nozzle 40 is selectively opened and closed by means of a vent door 46 which is hinged on the inner wall of the conditioning air passage 32. The vent door 46 is driven by means of a vent door actuator motor 48. The defroster nozzle 42 and the foot nozzle 44 are selectively opened and closed by means of a defroster/foot selecting door 50. The defroster/foot selecting door 50 is hinged on the inner wall of the conditioning air passage 32 to be operated between a defroster mode position, in which the foot nozzle 44 is closed and the defroster nozzle 42 is fully opened, and a foot mode position, in which the defroster nozzle 42 is closed and the foot nozzle is fully opened. The defroster/foot selecting door 50 is driven by means of a selecting door actuator motor 52.

The vent nozzle 34 is divided into a plurality of nozzles which are formed in an instrument panel 54 arranged in front of front seats 56. A well known air flow direction setting unit 58 is provided on the end of each of the vent nozzles 34. The air flow direction setting unit 58 has a plurality of louvers 60 which are pivotably supported on the instrument panel 54 so that the direction of the air flow discharged from the vent nozzle 34 is changed horizontally. By changing the angle of the louvers 60, the air flow direction setting unit 58 is operable between a concentrated discharge air mode, in which the air flow discharged from the vent nozzle 34 is concentrated on the occupants of the front seats 56, and a diffused discharge air mode, in which it is directed toward the sides of the vehicular cabin.

The blower motor 28 and the actuator motors 24, 38, 48 and 52 are controlled by a control unit 62 which includes a microcomputer and produces a control signal on the basis of various input signals. The control unit is electrically connected to an ambient temperature sensor 64 for monitoring ambient temperature, a cabin temperature sensor 66 for monitoring temperature in the vehicular cabin, and an insolation sensor 68 for monitoring the magnitude of insolation. The ambient temperature sensor 64 comprises a thermistor and produces a sensor signal indicative of the ambient temperature. The cabin temperature sensor 66 comprises a thermistor and produces a sensor signal indicative of temperature in the vehicular cabin. The insolation sensor 68 comprises a phototransistor and produces a sensor signal indicative of the insolation magnitude. These sensor signals are inputted to the control unit 62. The control unit 62 is also connected to a cabin temperature setting unit 70 which includes a manual operation switch assembly for manually setting the desired cabin temperature. The cabin temperature setting unit 70 selectively sets the desired cabin temperature and generates a signal indicative of the set cabin temperature. The signal produced by the cabin temperature setting unit 70 is also inputted to the control unit 62.

The operation of an air conditioner system, according to the present invention, is described below.

Figure 2:
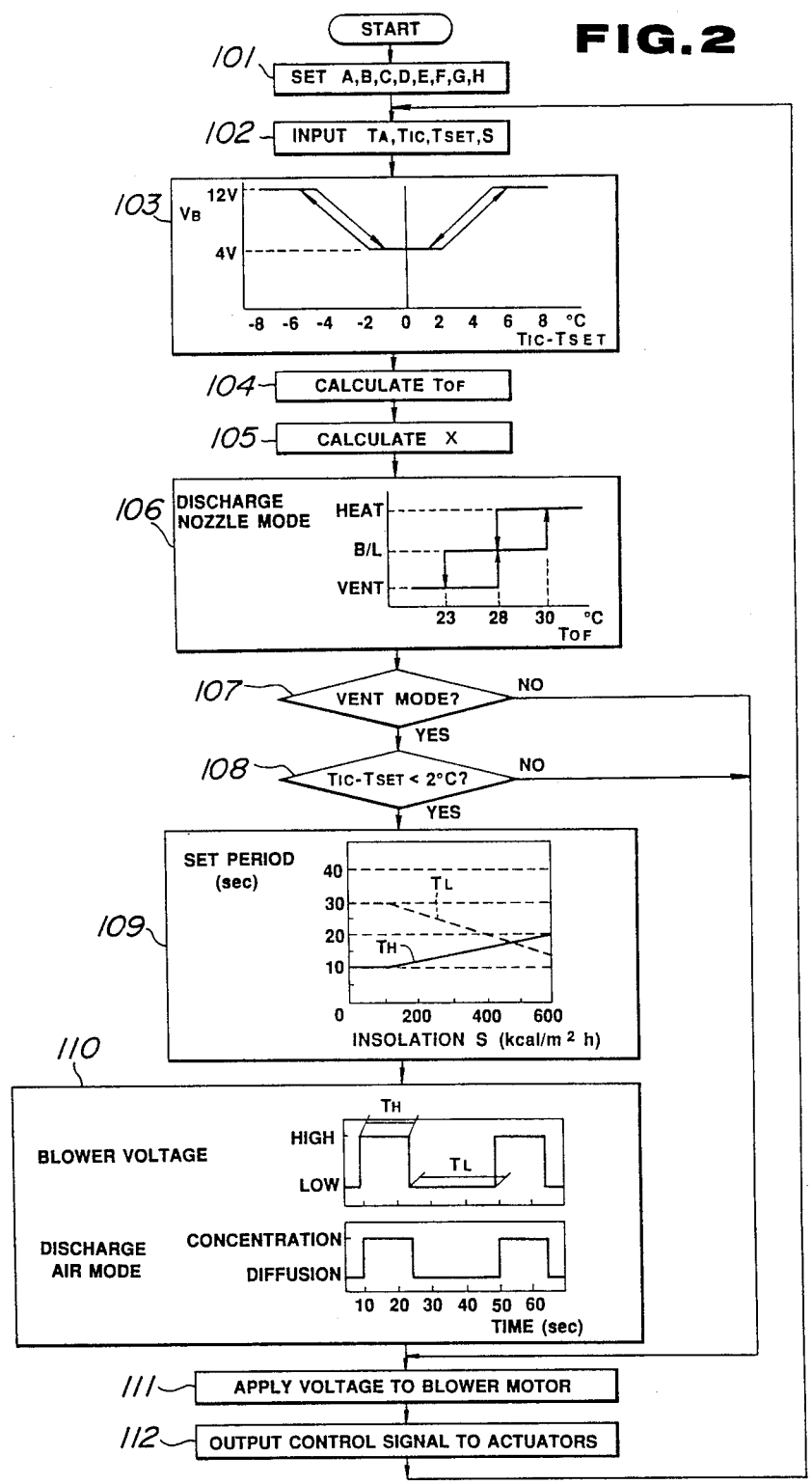
FIG. 2 is a flow chart illustrating a first preferred embodiment of control process in the air conditioner system of FIG. 1.

FIG. 2 illustrates a first preferred embodiment of a control process of the control unit 62 according to the present invention.

When a main switch (not shown) of the air conditioner system is turned on, the control unit 62 becomes active and the routine of FIG. 2 is executed. Immediately after starting execution of the routine of FIG. 2, constants A, B, C, D and E which are used for calculating the required discharge air temperature $T_{OF}$, and constants F, G and H which are used for calculating opening angle X of the air-mix door 36, are set at step 101.

At step 102, the sensor signals produced by the respective sensors are inputted to the control unit 62. That is, the sensor signals indicative of the ambient temperature $T_A$, the cabin temperature $T_{IC}$, the magnitude of insolation S, and the set cabin temperature $T_{SET}$ are inputted by the ambient temperature sensor 64, the cabin temperature sensor 66, the insolation sensor 68 and the cabin temperature setting unit 70, respectively. These sensor signals serve as ambient temperature data, cabin temperature data, insolation data and set cabin temperature data, respectively.

At step 103, the difference between the cabin temperature $T_{IC}$ and the set cabin temperature $T_{SET}$ is calculated. On the basis of the difference $T_{IC}$-$T_{SET}$, the voltage $V_B$ which is applied to the blower motor 28 is determined. Since rapid cooling or heating must be performed when the difference $T_{IC}$-$T_{SET}$ is great, the voltage $V_B$ is set to be relatively high. For example, when the absolute value of the difference $T_{IC}$-$T_{SET}$ is greater than about 5° C., the voltage $V_B$ is set at 12 volts. As the absolute value of the difference $T_{IC}$-$T_{SET}$ decreases, the voltage $V_B$ decreased gradually. For example, when the difference $T_{IC}$-$T_{SET}$ is less than about 2° C., the voltage $V_B$ is set at 4 volts.

At step 104, the required discharge air temperature $T_{OF}$ is calculated from the ambient temperature $T_A$, the cabin temperature $T_{IC}$, the set cabin temperature $T_{SET}$ and the insolation S in accordance with the following equation.

$$T_{OF}=A\times T_A+B\times T_{IC}+C\times T_{SET}+D\times S+E$$

in which A, B, C, D and E are constants.

On the basis of the required discharge air temperature $T_{OF}$ calculated at the step 104, at step 105, the opening angle X of the air-mix door 36 is calculated in accordance with the following the equation.

$$X=F\times T_{OF}^2+G\times T_{OF}+H$$

in which F, G and H are constants.

At step 106, the discharge nozzle mode is determined on the basis of the required discharge air temperature $T_{OF}$ calculated at step 104. At step 106, until the required discharge air temperature $T_{OF}$ decreases to 28° C., the operation mode is set to be HEAT mode in which both the defroster and foot nozzles 42 and 44 are opened. Thereafter, while the required discharge air temperature $T_{OF}$ further decreases to 23° C., the operation mode is set to be BI-LEVEL mode in which both the vent and foot nozzles 40 and 44 are opened. If the required discharge air temperature $T_{OF}$ further decreases to be less than 23° C., the operation mode is set to be VENT mode in which only the vent nozzle 40 is opened. On the other hand, until the required discharge air temperature $T_{OF}$ increases to 28° C., the operation mode is set to be the VENT mode. Thereafter, while the required discharge air temperature $T_{OF}$ further increases to 30° C., the operation mode is set to be the BI-LEVEL mode. If the required discharge air temperature $T_{OF}$ further increases to be greater than 30° C., the operation mode is set to be the HEAT mode.

Thereafter, the routine goes from step 106 to step 107 in which whether or not the set discharge nozzle mode is the VENT mode is determined. When the set discharge nozzle mode is not VENT mode, the routine goes to step 111 in which the voltage $V_B$ determined at step 103 is applied to the blower motor 28. Thereafter, the routine goes to step 112 in which control signals are outputted to the corresponding actuator motors 48 and 52 so that the HEAT or BI-LEVEL mode is set. On the other hand, when it is determined that the set discharge nozzle mode is VENT mode at step 107, the routine goes to step 108 in which whether or not the difference $T_{IC}$-$T_{SET}$ is less than 2° C. is determined. When the difference $T_{IC}$-$T_{SET}$ is not less than 2° C., the routine goes to step 111 in which the voltage $V_B$ determined at step 103 is applied to the blower motor 28. Thereafter, routine goes to step 112 in which control signals are outputted to the corresponding actuator motors 48 and 52 so that the VENT mode is set. On the other hand, when it is determined that the difference $T_{IC}$-$T_{SET}$ is less than 2° C. at step 108, the routine goes to step 109.

At step 109, a period $T_L$ of low discharge air quantity in which the voltage $V_B$ applied to the blower motor 28 is low, and a period $T_H$ of high discharge air quantity in which the voltage $V_B$ is high, are determined on the basis of the insolation S. The period $T_L$ of low discharge air quantity is set such that it decreases from 30 seconds to 15 seconds as the insolation S increases. On the other hand, the period $T_H$ of high discharge air quantity is set such that it increases from 10 seconds to 20 seconds as the insolation S increases. Thereafter, the routine goes to step 110.

At step 110, the voltage $V_B$ applied to the blower motor 28 is controlled in relation to time, on the basis of the periods $T_L$ and $T_H$ determined at step 109. That is, the voltage $V_B$ is maintained at a predetermined high voltage for the period $T_H$, and at a predetermined low voltage for the period $T_L$. This control will be referred to hereinafter as "air-flow control". At this step, the air flow direction setting unit 58 is also controlled between the concentrated discharge air mode and the diffused discharge air mode. This control will be referred to hereinafter as "concentration/diffusion control". The timing of concentration/diffusion control is so performed as to coincident with that of the air-flow control. In addition, the period of the concentrated discharge air mode corresponds to the period $T_H$ of high discharge air quantity, and the period of the diffused discharge air mode corresponds to the period $T_L$ of low discharge air quantity. That is, when the blower voltage $V_B$ is the high voltage, the mode of the air flow direction setting unit 58 is set to be the concentrated discharge air mode, and when it is the low voltage, the air mode thereof is set to be the diffused discharge air mode. Therefore, the occupants of the seats 56 can obtain comfortable ventilation when the mode of the air flow direction setting unit 58 is changed from the diffused discharge air mode to the concentrated discharge air mode while high voltage is applied to the blower motor 28.

As set forth above, according to the present invention, the period $T_H$ of high discharge air quantity is so determined as to increase as the insolation S increases, and the low period $T_L$ of low discharge air quantity is so determined as to decrease as the insolation S increases. Therefore, when thermal load on the occupants of the seats 56 is relatively high, for example, in fine whether in the daytime in summer, the occupants can obtain comfortable ventilation which is sufficient for compensating the high thermal load due to sun shine, since the periods $T_H$ and $T_L$ are set to be relatively long and short periods, respectively. On the other hand, when the insolation S or the thermal load on the occupants is small, the periods $T_H$ and $T_L$ are set to be relatively short and long periods, respectively. Therefore, it is possible to prevent excessive air flow from being directed on the occupants.

After the process at step 110, the routine goes to step 111 in which the voltage $V_B$ determined at step 110 is applied to the blower motor 28. Thereafter, the routine goes to step 112 in which control signals are outputted to the corresponding actuator motors 48 and 52 so that the HEAT or BI-LEVEL mode is set.

Figure 3:
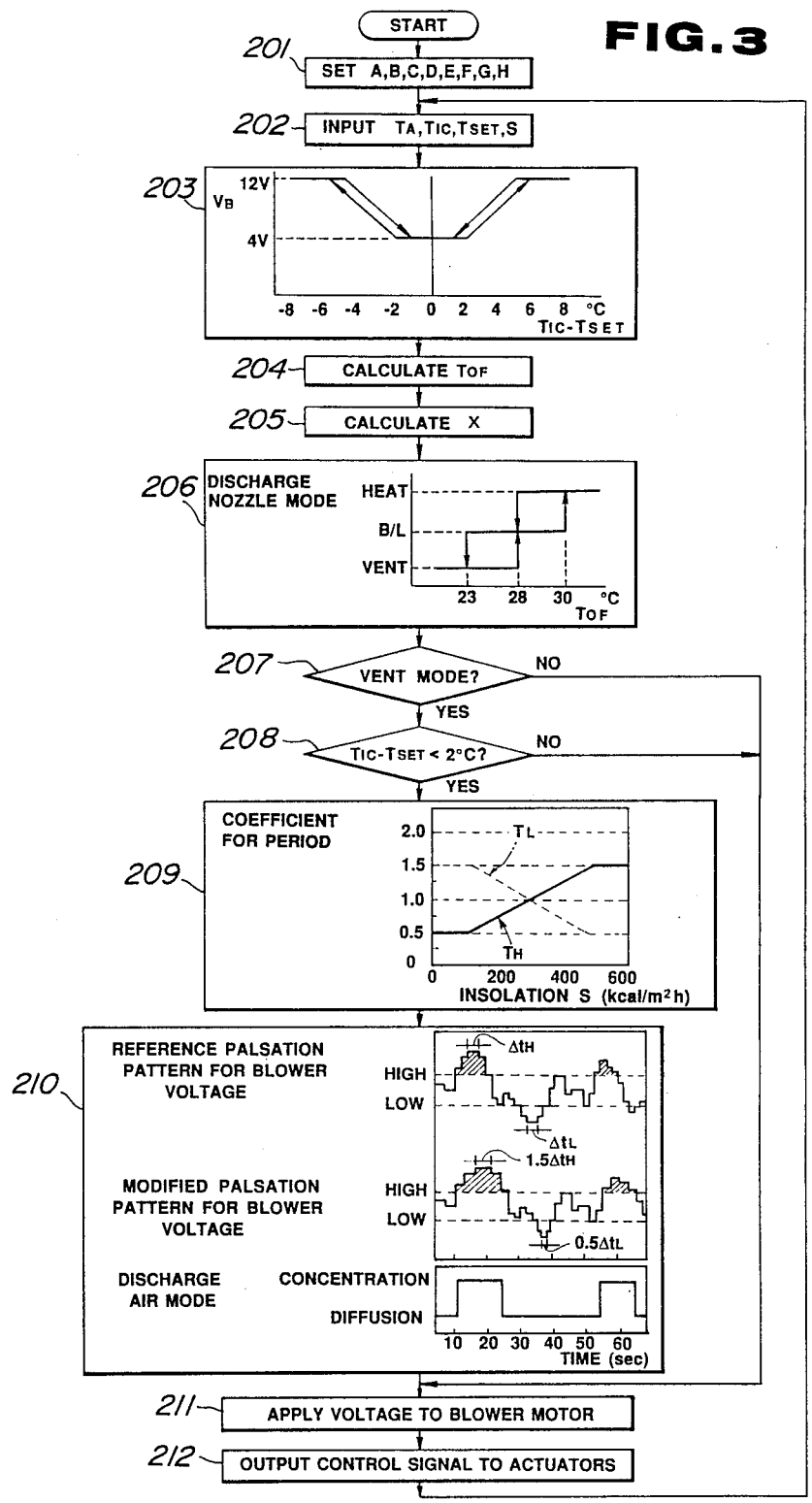
FIG. 3 is a flow chart illustrating a second preferred embodiment of control process in the air conditioner system of FIG. 1.

FIG. 3 illustrates a second preferred embodiment of control process of the control unit 62 according to the present invention. In this embodiment, steps 209 and 210 are substituted for steps 109 and 110 of FIG. 2, respectively. At step 209 corresponding to step 109 of the first preferred embodiment of the invention, a coefficient for each of the periods $T_H$ and $T_L$ is determined on the basis of the insolation S. A predetermined set period multiplied by the obtained coefficient is the respective periods $T_H$ and $T_L$. The coefficient for the period $T_H$ is designed to increase from 0.5 to 1.5 as the insolation S increases, and the coefficient for the period $T_L$ is designed to decrease from 1.5 to 0.5 as the insolation S increases. For example, when the insolation S is 500 Kcal/m²h, the period $T_H$ is 1.5 times as large as the predetermined set period, and the period $T_L$ is half of the perdetermined set period. After the process at step 209, the routine goes to step 210.

At step 210 corresponding to step 110 of the first preferred embodiment of the invention, the voltage $V_B$ applied to the blower motor 28 is determined in relation to time. Reference values for the respective high and low discharge air quantity are previously set in a predetermined reference pulsation pattern for the voltage $V_B$. When the voltage $V_B$ is greater than the reference value for the high discharge air quantity, the period $T_H$ is multiplied by the coefficient for the period $T_H$, e.g. 1.5, which was obtained at step 209. On the other hand, when the voltage $V_B$ is less than the reference value for the low discharge air quantity, the period $T_L$ is multiplied by the coefficient for the $T_L$, e.g. 0.5, which was obtained at step 209. By this operation, the reference pulsation pattern for the voltage $V_B$ is modified. In addition, at this step, the concentration/diffusion control is performed similarly to the first preferred embodiment of the present invention.

According to this embodiment, the voltage $V_B$ applied to the blower motor 28 is controlled in a more precise manner than that of the first preferred embodiment, so that the occupants can obtain more comfortable ventilation.

FIG. 4 illustrates a third preferred embodiment of control process of the control unit 62 according to the present invention. In this embodiment, steps 308 and 309 are substituted for steps 108 through 110 of FIG. 2, and steps 310 and 311 are similar to steps 111 and 112 of FIG. 2, respectively.

At step 308, the amplitude of the pulsed voltage is determined on the basis of the insolation S. Thereafter, the routine goes to step 309 in which the volage $V_B$ is so controlled as to fluctuate periodically, such as along a sine curve. The voltage $V_B$ fluctuates with a reference voltage $V_{ref}$ as the center line, so as to have the amplitude determined at step 308. At step 309, the concentration/diffusion control is also performed similar to the first preferred embodiment of the present invention.

According to this embodiment, when the insolation S or the thermal load applied to the occupants is relatively high, the amplitude of the voltage $V_B$ is set to be great in value. Therefore, a great amount of discharge, sufficient for compensating the high thermal load is directed onto the occupants, so that they can obtain comfortable ventilation. On the other hand, when the insolation S is relatively low, the amplitude of the voltage $V_B$ is set to be small in value. Therefore, it is possible to prevent excessive air flow from blowing against the occupants, so that they can obtain comfortable ventilation.

What is claimed is:

1. An air conditioner system for an automotive vehicle comprising:
   conditioning air passage means defining a conditioning air path and including an air outlet which opens into a vehicular cabin for discharging conditioning air into said vehicular cabin;
   conditioning air generating means for adjusting temperature of the conditioning air to be discharged into said vehicular cabin;
   temperature setting means for allowing manual setting of a desired temperature of the conditioning air in said vehicular cabin to produce a first signal indicative of the set temperature;
   first sensor means for monitoring temperature in said vehicular cabin to produce a second signal indicative of the vehicular cabin temperature;
   second sensor means for monitoring insolation in said vehicular cabin to produce a third signal indicative of the insolation; and
   control means, associated with said conditioning air generating means, for adjusting discharge amount of said conditioning air into said vehicular cabin depending upon the difference between said first and second signal values, and causing said discharge amount to fluctuate between predetermined low and high values when the difference between said first and second signal values is less than a predetermined value, said control means for adjusting period of low and high values depending upon said third signal value.

2. An air conditioner system as set forth in claim 1, wherein said control means includes a blower driven by means of a blower motor, adjusts voltage applied to said blower motor depending upon said first and second signal values, and causes said voltage to fluctuates between said first and second signal values is less than the predetermined value.

3. An air conditioner system as set forth in claim 2, wherein the voltage applied to said blower motor fluctuates between a predetermined high voltage and a predetermined low voltage when the difference between said first and second signal values is less than the predetermined value, and wherein the period of the high voltage is set to increase as the third signal values increases, and the period of the low voltage is set to decrease as the third signal values increases.

4. An air conditioner system as set forth in claim 2, wherein the voltage applied to said blower motor fluctuates periodically when the difference between said first and second signal values is less than the predetermined value, and the difference between said first and second signal values is less than the predetermined value, and the difference between the maximum and minimum values of the voltage varies depending upon the third signal value.

5. An air conditioner system as set forth in claim 1, wherein said air outlets is a vent nozzle.

6. An air conditioner system as set forth in claim 1, wherein the difference between said first and second signal values is 2° C.

* * * * *